Dec. 9, 1952  F. R. McFARLAND  2,620,684
TRANSMISSION
Filed Sept. 27, 1947
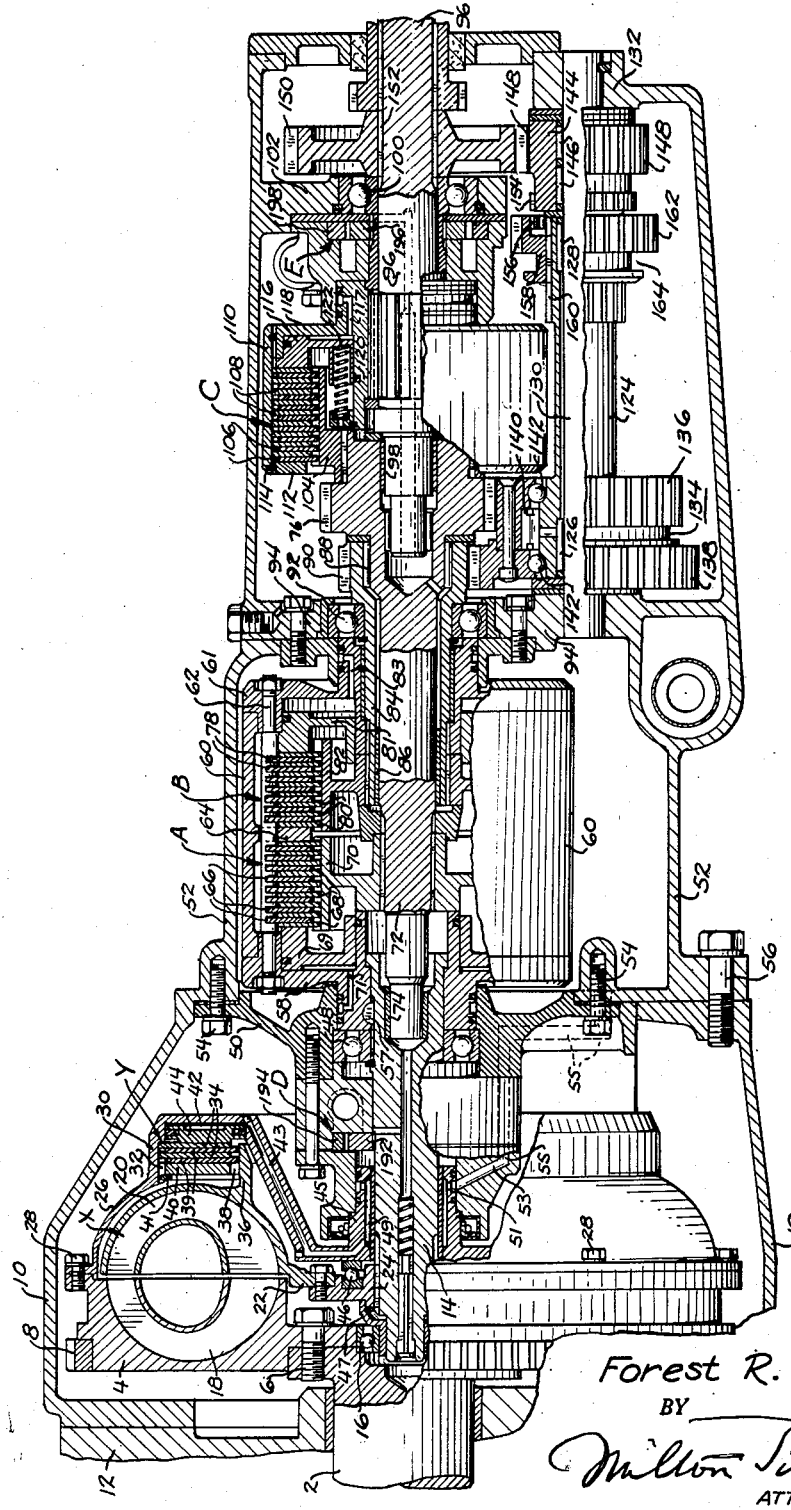
INVENTOR.
Forest R. McFarland
BY
Milton Tibbetts
ATTORNEY.

Patented Dec. 9, 1952

2,620,684

UNITED STATES PATENT OFFICE 2,620,684

TRANSMISSION

Forest R. McFarland, Huntington Woods, Mich., assignor to Packard Motor Car Company, Detroit, Mich., a corporation of Michigan Application September 27, 1947, Serial No. 776,486

4 Claims. (Cl. 74—732)

This invention relates to transmissions, and more particularly to an improved multi-speed ratio transmission wherein a fluid medium is employed to transmit torque in a low speed ratio drive, and a mechanical clutch is employed to transmit torque in a high speed ratio drive.

An object of this invention is to provide a low speed ratio fluid drive, and a high speed ratio mechanical drive for a multi-speed transmission having a plurality of geared speed ratio drives controlled by a plurality of selectively operable clutches.

A further object of the invention resides in the provision of a transmission having cooperating impeller and turbine members interposed between a power shaft and a driving shaft to transmit power through a fluid unit in a low speed ratio drive, and having means to clutch the driving shaft to the power shaft to provide a positive drive in parallel with the fluid unit in a high speed ratio drive.

Yet a further object of the invention is to provide an improved drive for a multi-speed ratio transmission wherein torque is delivered to the transmission through a fluid clutch when the transmission is operating in a low speed ratio drive, and wherein torque is delivered to the transmission through a mechanical drive when the transmission is operating in a high speed ratio drive.

Another object of the invention is to improve the operation of a four speed transmission having successively engaging friction clutches driving through low and high range gearing by driving the low range gearing through a fluid clutch and driving the high range gearing through a non-yielding mechanical drive.

Other objects of this invention will appear in the following description and appended claims, reference being had to the accompanying drawing forming a part of this specification.

The drawing is a longitudinal sectional view of a transmission embodying my invention.

It is to be understood that the invention is not limited in its application to the details of construction and arrangement of parts illustrated in the accompanying drawing, since the invention is capable of other embodiments and of being practiced or carried out in various ways. Also it is to be understood that the phaseology or terminology employed herein is for the purpose of description and not of limitation.

My improved transmission drive is illustrated as embodied in the multi-speed ratio transmission disclosed in application Serial No. 761,475, filed July 17, 1947, by Jesse G. Vincent.

Referring now more particularly to the drawing it will be noted that a crankshaft 2 of an engine is connected to a transmission power shaft in the form of a flywheel 4 in any convenient manner as by studs 6. The power shaft or flywheel 4 is provided with a starter gear 8 and is housed within a casing 10 secured to the engine block or other portion 12 of the prime mover.

A driving shaft 14 has its forward end journalled in a bearing 16 mounted in the power shaft or flywheel 4, and is adapted to be yieldingly driven thereby through a fluid clutch X or a mechanical clutch Y. The fluid clutch X consists of a fluid energizing impeller 18 preferably formed in the rear face of the flywheel 4, and an energy absorbing turbine 20 cooperating with the impeller to form a power transmitting fluid circuit. The turbine 20 has an inwardly extended flange 22 secured to a hub 24 splined to the forward end of the driving shaft 14.

A housing 26 secured to the flywheel 4 as by bolts 28 overlies the outer end of the turbine 20, and is provided with an axially extended cylinder 30 having a plurality of axially extending splines 32 to receive driving disks 34 of the mechanical clutch Y. The turbine 20 is provided with an axially extended flange 36 having splines 38 to receive driven disks 39 of the clutch Y whereby a substantially non-yielding mechanical drive may be transmitted from the power shaft or flywheel 4 to the turbine 20 through the clutch Y.

A backing plate 40 restrained against forward movement in the cylinder 30 of the housing 26 by a snap ring 41 forms an abutment to prevent the disks 34 and 39 from shifting forwardly when they are moved to the engaging position by fluid pressure exerted in a ring type chamber 42 in the cylinder 30 to urge a piston 44 forwardly in the cylinder to engage the driving disks 34 with the driven disks 39.

The housing 26 secured to the power shaft or flywheel 4 is provided with a hub 45 surrounding the driving shaft 14. A bearing 46 interposed between the forward end of the hub 45 and a portion of the hub 24 is provided to locate the turbine 20 axially with reference to the impeller 18, a spacer 47 mounted on the forward end of the driving shaft 14 being provided to limit forward movement of the turbine 20.

Fluid under pressure may be introduced into the chamber 42 of the cylinder 30 to actuate the piston 44 to engage the clutch Y through passages 43, 49, 51, 53 and 55 as illustrated.

The rear end of the driving shaft 14 is journalled in a bearing 48 positioned in a cover 50 secured to a casing 52 as by studs 54. The casing 52 is secured to the casing 10 as by studs 56, and extends rearwardly therefrom to house the transmission mechanism.

The driving shaft 14 is keyed as at 57 to a flanged member 58, which is connected to a clutch housing 60. A member 61 which is symmetrical with the member 58 is positioned at the other end of the housing 60, bolts 62 being provided to secure the members 58 and 61 to the housing 60.

The clutch housing 60 is provided with a central abutment 64 dividing the space therein to receive a front clutch A and a rear clutch B. The front clutch A has a plurality of driving friction disks 66 keyed to the housing 60 to transmit a drive to driven friction disks 68 keyed to a hub 70 splined to an intermediate shaft 72. The front clutch A is engaged through a ring type piston 69 by fluid under pressure supplied through a port 71 to engage the driving disks 66 with the driven disks 68 between the abutment 64 and the piston 69. The intermediate shaft 72 has its forward end journalled in a bearing 74 concentrically mounted in the rear end of the driving shaft 14, and carries a gear 76 adjacent its rear end.

The rear clutch B has a plurality of driving friction disks 78 keyed to the housing 60 to transmit a drive to driven friction disks 80 keyed to a hub 82 splined to a sleeve shaft 84 surrounding the intermediate shaft 72. The rear clutch B is engaged through a ring type piston 81 by fluid under pressure supplied through a port 83 to engage the driving disks 78 with the driven disks 80 between the abutment 64 and the piston 81. The sleeve shaft 84 is concentrically mounted on the intermediate shaft 72 through bearings 86 and 88, and has a gear 90 positioned at its rear end, adjacent the gear 76 carried by the shaft 72. The rear end of the sleeve shaft 84 is journalled in a bearing 92 positioned in an inwardly extending web 94 of the casing 52.

A final driven shaft 96 has its forward end journalled in a bearing 98 concentrically mounted in the intermediate shaft 72, and is journalled at a point spaced therefrom in a bearing 100 positioned in an inwardly extended web 102 of the casing 52.

A range controlling mechanism is provided to vary the speed ratio of the drive transmitted through the rear and front clutches B and A respectively. For example, a clutch C is interposed between the intermediate shaft 72, driven by the front clutch A, and the final driven shaft 96. When the clutch C is disengaged torque is directed from the engine through the low range gearing to provide the first and second speed ratio drives. When the clutch C is engaged torque from the engine is directed through the high range gearing to provide the third and fourth speed ratio drives.

A hub 104 of the clutch C is splined to the rear end of the intermediate shaft 72 and is provided with a plurality of friction driving disks 106 keyed thereon and adapted to engage driven disks 108 keyed to a clutch housing 110. A backing plate 112 keyed to the housing 110 and restrained against axial displacement therein by a snap ring 114 forms an abutment for one end of the friction disks. A ring type piston 116 is interposed between the rear end of the friction disks and an end closure 118 fixed to the housing 110 to urge the clutch disks into driving engagement with each other when the piston is actuated hydraulically by fluid under pressure introduced through a port 117. A hub 120 of the end closure 118 is splined to the final driven shaft 96 to interconnect the intermediate shaft 72 with the final driven shaft 96 when the high range clutch C is engaged. Yielding means such for example as coiled springs 122 are provided to urge the piston 116 toward the clutch releasing position.

A layshaft sleeve 124 is rotatably mounted through spaced bearings 126 and 128 on a spindle 130 having its forward end secured in the wall 94 of the casing 52, and having its rear end secured in an inwardly extended wall 132 defining a rear closure for the casing 52. A compound gear 134 having spaced gears 136 and 138 meshing with the gears 76 and 90 driven by the front and rear clutches A and B respectively is mounted on the sleeve 124. A one-way driving clutch 140 is interposed between the compound gear 134 and the sleeve 124 to selectively transmit a drive from either of the gears 76 or 90 to the sleeve 124, and to permit the compound gear 134 to overrun the sleeve 124 on the bearings 142 under certain conditions of operation.

A hub 144 mounted on the spindle 130 through spaced bearings 146 adjacent the rear end of the sleeve 124 is provided with a gear 148 meshing with a gear 150 splined to the final driven shaft 96 as illustrated at 152. The hub 144 is provided with dental teeth 154 spaced forwardly of the gear 148 to be engaged by internal dental teeth 156 of a coupler 158 slidably mounted on splines 160 on the sleeve 124. The coupler 158 is provided with a gear 162 to engage a conventional idler gear, (not shown) of a reverse gear train to rotate the final driven shaft 96 in the reverse direction when the coupler 158 is shifted forwardly on the splines 160. The coupler 158 has a groove 164 to receive a shifter fork to move the coupler axially on the splines 160 of the sleeve 124 to engage the dental teeth 156 with the teeth 154 to effect a forward drive, or to engage the gear 162 of the coupler with the idler gear of the reverse gear train to effect the reverse drive.

Means driven by the driving shaft 14 and by the final driven shaft 96 are provided to supply fluid, such as oil, under pressure to actuate the front and rear clutches A and B, the mechanical clutch Y and the high range clutch C, and to cooperate with other elements as described in said copending application of Jesse G. Vincent, Serial No. 761,475, filed July 17, 1947, to control the engagement and release of the various clutches.

A front pump D having an impeller 192 splined to the driving shaft 14, and a stator 194 secured to the stationary cover 50 is provided to supply fluid under pressure proportionate to driving shaft speed. A rear pump E having an impeller 196 splined to the final driven shaft 96, and a stator 198 secured to the web 102 of the casing is provided to supply fluid under pressure proportionate to the speed of the final driven shaft 96.

This transmission functions to provide four forward speeds. The first and second speed ratio drives are effected by successively engaging the rear and front clutches B and A respectively with the clutch Y and the high range clutch C disengaged, and the third and fourth speed ratio drives are effected by again successively engaging the rear and front clutches B and A respectively, with the high range clutch C engaged, and with the clutch Y preferably engaged.

To effect the first speed ratio drive in the forward direction with the engine running, the conventional forward and reverse shift lever is moved from the neutral position to the forward drive position to shift the coupler 158 rearwardly to engage its dental teeth 156 with the teeth 154 of the hub 144 connected with the final driven shaft 96 through the gears 148 and 150. With the clutch Y and the high range clutch C disengaged, the rear clutch B is engaged upon movement of the accelerator pedal in the speed increasing direction. Torque from the engine is then directed from the crankshaft 2 and flywheel 4 through the impeller and turbine members 18 and 20 of the fluid clutch X to the driving shaft 14. Rotation of the shaft 14 is transmitted through the clutch housing 60, driving disks 78 and driven disks 80 of the rear clutch B and hub 82 to drive the sleeve shaft 84 having the gear 90 fixed thereto. The gear 90 drives the gear 138 of the compound gear 134, and power is transmitted through the one-way clutch 140 to drive the sleeve 124, coupler 158, internal teeth 156, dental teeth 154 and gear 148 to drive the gear 150 secured to the final driven shaft 96 to rotate it in the forward direction to provide a relatively low ratio starting drive.

To engage the second speed ratio drive the clutch Y and the high range clutch C remain disengaged. The rear clutch B is disengaged and the front clutch A is engaged. The drive is then transmitted from the driving shaft 14 and clutch housing 60 through the clutch plates 66 and 68 of the front clutch A, hub 70 to the intermediate shaft 72, gears 76 and 136, one-way clutch 140 and sleeve shaft 124 to drive the final driven shaft 96 at a higher speed ratio.

To engage the third speed drive, the high range clutch C is engaged to clutch the final driven shaft 96 to the intermediate shaft 72, and the clutch Y is preferably engaged, the front clutch A is released and the rear clutch B is engaged. Power then flows from the flywheel 4 through the driving and driven disks 34 and 39 of the clutch Y to provide a positive drive for the turbine 20 and driving shaft 14. Power is then directed through the clutch housing 60 and rear clutch B, through the sleeve shaft 84 and gear 90 to drive the gear 138 of the compound gear 134, through gear 136 of the compound gear 134 to gear 76 fixed to the intermediate shaft 72 and through the high range clutch C to the final driven shaft 96 to provide a still higher speed ratio dependent on the ratio of the gears 136 and 138 of the compound gear 134.

To engage the fourth speed ratio or direct drive, the high range clutch C and the clutch Y remain engaged, the rear clutch B is released and the front clutch A is engaged whereupon power flows through the clutch Y and intermediate shaft 72 driven by the front clutch A, through high range clutch C to the final driven shaft 96 to provide a direct drive.

Means are provided to automatically control the engagement and release of the front and rear clutches A and B, the high range clutch C and the clutch Y in response to variations of vehicle speed and power supplied by the engine, or expressed another way to vary the speed ratio of the transmission by speed and torque responsive means.

The front and rear clutches A and B, and the high range clutch C are controlled by a series of interconnected clutch selecting and clutch actuating valves to vary the time of engagement of the clutches A, B and C in proportion to variations of vehicle speed and accelerator pedal position as more fully disclosed in said copending application of Jesse G. Vincent. It is preferred that the clutch Y shall be engaged simultaneously with the high range clutch C, by fluid under pressure admitted to the chamber 42 through the passages 55, 53, 51, 49 and 47. The clutch Y will of course be actuated by fluid pressure eminating from the same source of fluid pressure as is employed to engage the high range clutch C, that is the front pump D will preferably supply fluid under pressure to engage the clutch Y, and the rear pump E will supply fluid under pressure to actuate the controls in the manner disclosed in said copending Vincent application.

If desired the positive clutch Y may be engaged to provide a non-yielding drive in parallel with the fluid clutch X when the fourth speed or direct drive is engaged. This may be accomplished by connecting the chamber 42 of the clutch Y to the control mechanism for actuating the front clutch A and the high range clutch C in such a manner that the chamber 42 of the clutch Y is subjected to fluid pressure only when the front clutch A is engaged while the high range clutch C is also engaged.

One of the important features of my invention is the fact that in the low speed ratio or starting drive when the prime mover is rotating at relatively slow speeds, the drive is transmitted through the fluid coupling X to damp out torque impulses that would otherwise be transmitted to the final driven shaft 96. When the transmission is functioning in the high speed ratio drive when the prime mover is rotating at high speeds the drive is transmitted through the positive drive clutch Y to provide a mechanical connection between the prime mover and the transmission, thereby minimizing power losses, and transmitting power smoothly because at high speeds of the prime mover the individual torque impulses are of less magnitude.

It will be apparent that any desired control mechanism may be employed to engage the clutch Y thereby forming a drive in parallel with the fluid clutch X upon the engagement of a predetermined high speed ratio drive. It will also be apparent that my improved drive may be employed with any desired type of multi-speed transmission to provide a fluid drive at low speed ratio drives, and a mechanical drive at a higher speed ratio drive.

It will be understood that various forms of the invention other than those described above may be used without departing from the spirit or scope of the invention.

I claim:

1. A transmission drive means having a power shaft, a driving shaft, a final driven shaft, speed ratio changing means including at least a low and high range of gearing between the driving and driven shafts to provide a plurality of different speed ratio drives therebetween, comprising a plurality of clutches controlling said gearing, a fluid coupling including impeller and turbine members cooperating respectively with said power and driving shafts, and a mechanical clutch operatively positioned between the members of said fluid coupling to provide a solid drive between said shafts, said power shaft including a first housing means integral therewith having said impeller member fixed therein, a second housing means integral with said first housing means, said second housing means enclosing said turbine member, a third generally cylindrical housing means supported from said second housing means, said third housing means including two elements, one of said elements being fixed to said second housing means and the other of said elements being fixed to said turbine member, said mechanical clutch being releasably positioned between said two elements, means to actuate said mechanical clutch to provide a solid drive, means to actuate said plurality of clutches controlling said gearing, and control means to cause said mechanical clutch actuating means to become operative only after the low gear range has been passed.

2. A drive means having a power shaft, a driving shaft and a driven shaft, a fluid coupling including impeller and turbine members cooperating respectively with said power and driving shafts, and a mechanical clutch operatively positioned between the members of said fluid coupling to provide a solid drive between said shafts, said power shaft including a first housing means having said impeller means fixed therein, a second housing means integral with said first housing means, said second housing means enclosing said turbine member, a third housing means supported from said second housing means, said third housing means including two elements, one of said elements taking the form of an axially extending ring fixed to said second housing means and the other of said elements taking the form of a smaller and concentrically disposed axially extending ring fixed to said turbine member, an inwardly and radially extending wall fixed to the outer of said concentric rings, an outwardly and radially extending wall fixed to the inner of said concentric rings, said walls being spaced apart in juxtaposed position, said mechanical clutch being releasably positioned between said two walls whereby said drive means may operate with a fluid coupling when the mechanical clutch is released and as a solid drive unit when the mechanical clutch is engaged, and means to actuate said mechanical clutch between its engaged and disengaged condition.

3. A drive means including a power shaft, a driving shaft, a fluid coupling including impeller and turbine members cooperating respectively with said power and driving shafts, and a mechanical clutch operatively positioned between the members of said fluid coupling to provide a solid drive between said shafts, said power shaft having a first housing means integral therewith which has said impeller member fixed therein, a second housing means integral with said first housing means, said second housing means enclosing said turbine member, a third housing means including two elements, one of said elements taking the form of an axially extending ring fixed to said second housing means and the other of said elements taking the form of a concentric axially extending ring fixed to said turbine member, two radially extending walls one of which is fixed integrally respectively with each of said rings, said walls being spaced apart in juxtaposed position, said mechanical clutch being releasably positioned between said two walls whereby said drive means may operate with a fluid coupling when the mechanical clutch is released and as a solid drive unit when the mechanical clutch is engaged, and means to actuate said mechanical clutch between its engaged and disengaged condition.

4. A drive means having a power shaft, a driving shaft, a fluid coupling including impeller and turbine members cooperating respectively with said power and driving shafts, and a mechanical clutch operatively positioned between the members of said fluid coupling to provide a solid drive between said shafts, comprising a first housing means integral with said power shaft and having said impeller member fixed therein, a second housing means integral with said first housing means, said second housing means enclosing said turbine member, a third housing means including two elements, one of said elements being fixed to said second housing means and the other of said elements being fixed to said turbine member, said mechanical clutch being releasably positioned between said two elements whereby said drive means may operate with a fluid coupling when the mechanical clutch is released and as a solid drive unit when the mechanical clutch is engaged, and means to actuate said mechanical clutch between its engaged and disengaged condition.

FOREST R. McFARLAND.

REFERENCES CITED

The following references are of record in the file of this patent:

UNITED STATES PATENTS

| Number | Name | Date |
|---|---|---|
| 2,202,378 | Hertrich | May 28, 1940 |
| 2,279,986 | Griswold | Apr. 14, 1942 |
| 2,333,680 | Schneider et al. | Nov. 9, 1943 |
| 2,351,483 | Carnagua | June 13, 1944 |
| 2,449,586 | Carnagua | Sept. 21, 1948 |
| 2,449,608 | Le May | Sept. 21, 1948 |
| 2,485,668 | Banker | Oct. 25, 1949 |

FOREIGN PATENTS

| Number | Country | Date |
|---|---|---|
| 867,896 | France | Dec. 2, 1941 |